(12) United States Patent
Brake

(10) Patent No.: US 6,726,159 B2
(45) Date of Patent: Apr. 27, 2004

(54) TANK SUPPORT SYSTEM OF GAS GRILL

(75) Inventor: George Brake, Dickson, TN (US)

(73) Assignee: Fiesta Gas Grills, LLC, Dickson, TN (US)

( * ) Notice: Subject to any disclaimer, the term of this patent is extended or adjusted under 35 U.S.C. 154(b) by 0 days.

(21) Appl. No.: 10/210,549

(22) Filed: Aug. 1, 2002

(65) Prior Publication Data

US 2003/0025050 A1 Feb. 6, 2003

Related U.S. Application Data

(60) Provisional application No. 60/309,710, filed on Aug. 2, 2001.

(51) Int. Cl.⁷ .............................................. A47G 23/02
(52) U.S. Cl. ........................ 248/154; 248/150; 248/507; 248/229.14; 403/238
(58) Field of Search ................................ 248/154, 153, 248/147, 146, 500, 507, 505, 229.14, 312.1, 313, 230.5, 292.13, 292.14, 291.1, 508, 509; 126/41 R; 220/592.12; 280/47.26, 47.27, 47.24; 414/456; 403/234, 238

(56) References Cited

U.S. PATENT DOCUMENTS

| | | | | |
|---|---|---|---|---|
| 2,367,256 A | * | 1/1945 | Atkins | |
| 2,797,832 A | * | 7/1957 | Weinmann | |
| 2,930,561 A | | 3/1960 | Bittle | 248/149 |
| 3,463,429 A | | 8/1969 | Novak | 248/147 |
| 4,245,505 A | * | 1/1981 | Baynes | 126/41 R |
| 4,322,049 A | * | 3/1982 | Holland | 248/154 |
| 4,331,310 A | | 5/1982 | Silva et al. | 248/146 |
| 4,413,515 A | * | 11/1983 | Quinn | 126/41 R |
| 4,741,494 A | | 5/1988 | Voornas | 248/154 |
| 4,799,444 A | | 1/1989 | Lisowski | 114/221 |
| 5,037,048 A | * | 8/1991 | Freed, Jr. | 248/154 |
| 5,458,309 A | * | 10/1995 | Craven, Jr. et al. | 248/231.9 |
| 5,873,355 A | * | 2/1999 | Schlosser et al. | 126/41 R |
| 5,931,149 A | * | 8/1999 | Lewis | 126/41 R |
| 6,135,104 A | * | 10/2000 | Lewis | 126/41 R |

* cited by examiner

Primary Examiner—Gwendolyn Baxter
(74) Attorney, Agent, or Firm—Waddey & Patterson; I. C. Waddey, Jr.

(57) ABSTRACT

Disclosed herein is a device for attaching a fuel tank to the leg of a gas grill frame to hold the tank on the grill. However, the device can be manipulated to disengage from the tank so that the tank can be removed from the grill and refilled. The device including an attaching bracket for a attaching the device to the leg of a gas grill frame and a tank clasp for releasably engaging a gas tank positioned on the gas grill frame. The attaching bracket is shaped to fit around the leg of a gas grill frame and snap together or be screwed together to hold the bracket in place. The tank clasp is pivotally connected to the attaching bracket for movement between an engaging position and a releasing position. In the engaging position, the clasp holds the gas tank on the gas grill frame. In the releasing position, the clasp is disengaged from the gas tank so that it can be removed and refilled. The device also includes a stop for holding said tank clasp in the engaging position. The clasp is formed of shaped wire and responds to pressure so that it will flex and bypass the stop and allow the clasp to move to the disengaged position so that the tank can be removed from the grill frame.

19 Claims, 6 Drawing Sheets

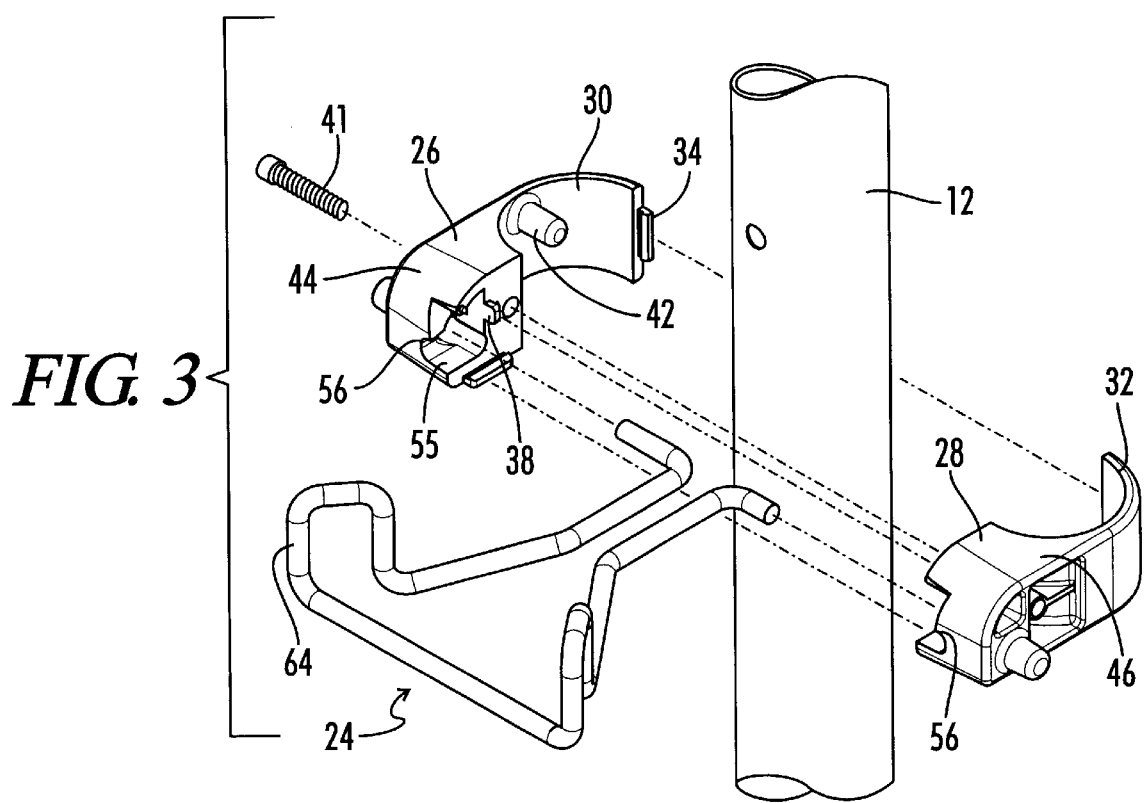
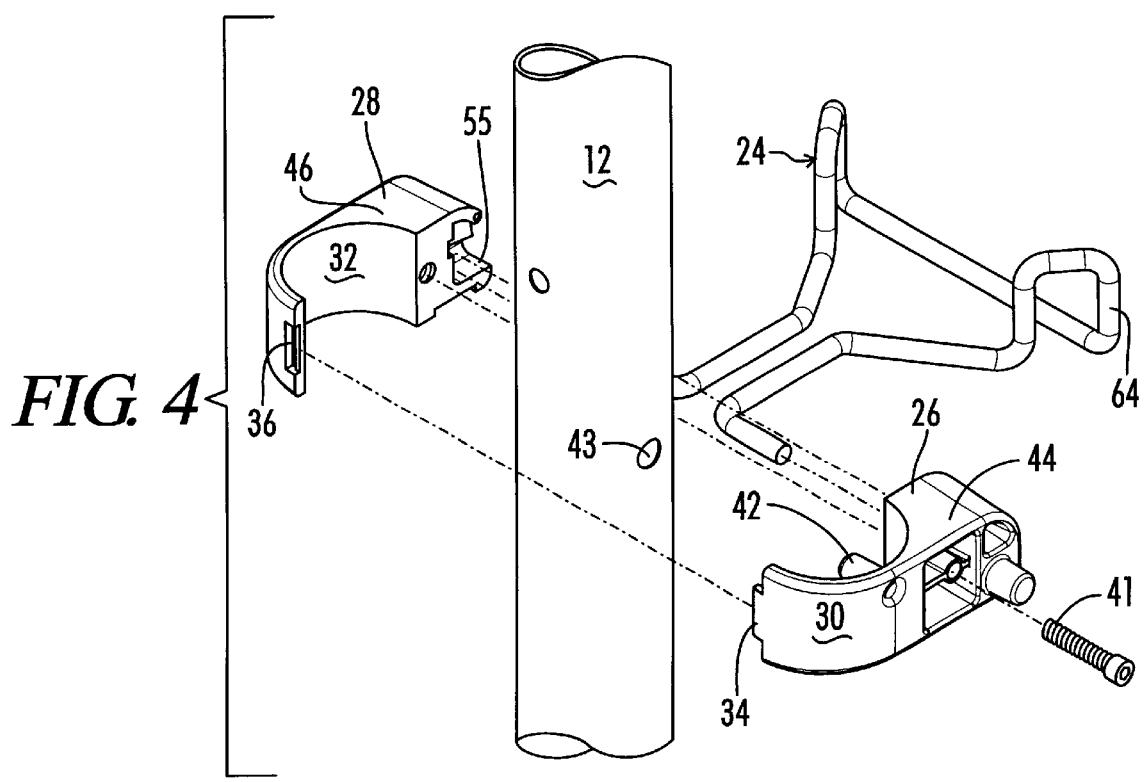

TANK SUPPORT SYSTEM OF GAS GRILL

This application claims benefit of co-pending U.S. Provisional Patent Application Ser. No. 60/309,710 filed Aug. 2, 2001, entitled "Tank Support System of Gas Grill" which is hereby incorporated by reference.

Be it known that I, George Brake, a citizen of The United States, residing at 315 Brady Drive, Dickson, Tenn. 37055 have invented a new and useful "Tank Support System of Gas Grill".

This invention relates to a tank support and more particularly to a propane gas tank support system for supporting a propane gas tank on a gas grill.

BACKGROUND OF THE INVENTION

Preparing meals by cooking meats, vegetables and other items on an outdoor grill has become a way of life throughout the world. Historically, charcoal grills were the first product of this type to achieve wide spread commercial acceptance. Gas-fired grills using lava rock and ceramic briquettes followed shortly thereafter. Gas fired grills traditionally are fueled using propane gas which is contained in a portable gas tank. The tank is generally supported on the frame of the grill and a valve attaches the gas supply line to the burner section of the grill. The tank is portable so that, when the propane supply is exhausted, the tank can be removed from the grill frame, carried independently of the grill to a refueling station, replenished and returned to the grill to be reinstalled. The tank being portable eliminates the need to carry the entire grill to the refueling station.

Most outdoor gas grills are designed to move about to various locations. Generally, the grills have a cart that includes wheels on one end and a handle on the other end so that the handle can be lifted and the cart rolled about to different locations on the wheels attached to the frame. Lifting the cart to roll it to a new location, moving the cart over rough stones, garden paths or down steps can cause the tank to shift about on the cart. For that reason, it has been desirable in the past to have a device that would latch or secure the gas tank to the frame of the grill. Such a system, of necessity, must have some mechanism for releasing the tank so that the tank could be refilled. However, devices in the prior art for attaching the tank to the grill are generally very cumbersome and often require tools to assemble and disassemble. Furthermore, such latching devices often become rusted and hard to disengage because generally a tank is only removed every one or two years, assuming the grill is not used daily.

What is needed then is a better system for attaching and disengaging the gas tank to a gas grill. Such a system is presently missing in the marketplace.

SUMMARY OF THE INVENTION

The invention is a device for attaching a fuel tank to the leg of the gas grill frame. The device includes an attaching bracket for attaching the device to the leg of the gas grill frame and a tank clasp for releasably engaging a gas tank that is positioned on the gas grill frame. The attaching bracket is shaped and designed to connect to the leg of the gas grill frame. Generally, a hole is provided in the leg of the gas grill frame at the proper height for a standard 20-pound liquid propane gas cylinder of standard configuration. A boss is provided on the inside of the bracket to fit into the hole on the frame leg to properly position the device. The tank clasp of the device is movably connected to the attaching bracket. The tank clasp has legs has project outwardly away from each other and fit into facing pockets on the attaching bracket so that the clasp can be rotated about the legs into a downward, or engaged, position and to an upward, or disengaged, position. When the clasp is in the downward or engaged position, fingers of the clasp fit over the handle ring of the propane tank and hold it in place on the gas grill. When the tank clasp is raised and moved to the disengaged position, the fingers disengaged the handle ring of the tank so that the tank fuel line can be disconnected from the grill and the tank removed to be refilled. The attaching bracket has a stop for holding the tank clasp in the engaging position. The tank clasp is generally made of formed wire and is flexible so that it can be pressured in a direction to disengage it from the stop and move pass the stop allowing the tank clasp to moved to the retracted, disengaged, position. When the clasp is in the disengaged position, the tank can be removed from the gas grill frame and taken to a remote location to be refilled.

BRIEF DESCRIPTION OF THE DRAWINGS

FIG. 3 shows the device of the present invention in a prospective, exploded view extending about the leg of the frame of the gas grill;

FIG. 4 is a view similar to FIG. 3 shown from the backside of the device;

DESCRIPTION OF THE PREFERRED EMBODIMENTS

Figure 1:
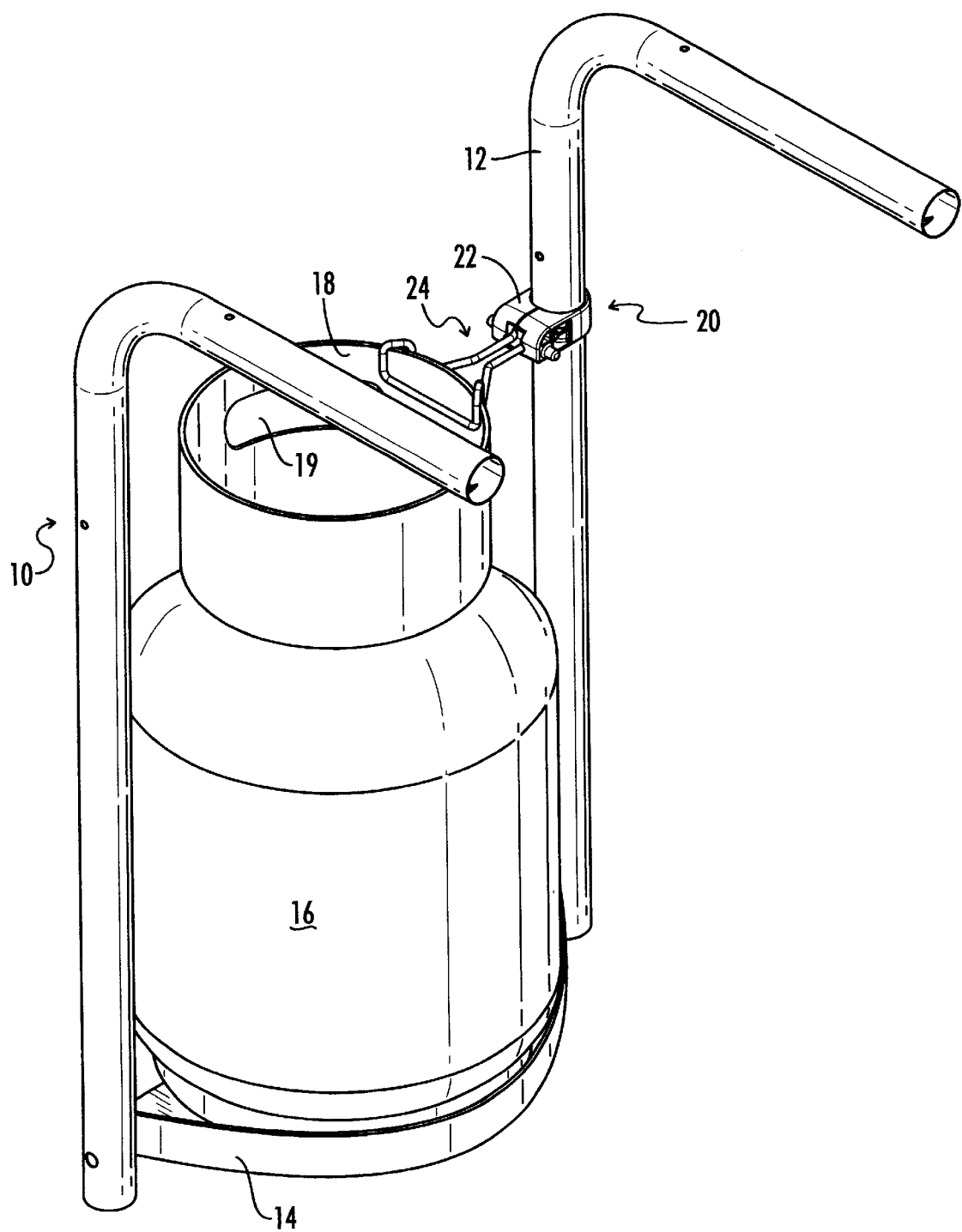
FIG. 1 is a perspective view of a portion of a gas grill frame with a propane tank position on the frame and held in place by the device of the present invention.

Referring now to the drawings, where like numerals represent identical parts in the various views of the preferred embodiment illustrated therein, the preferred embodiment of the present invention will be described in detail.

Figure 2:
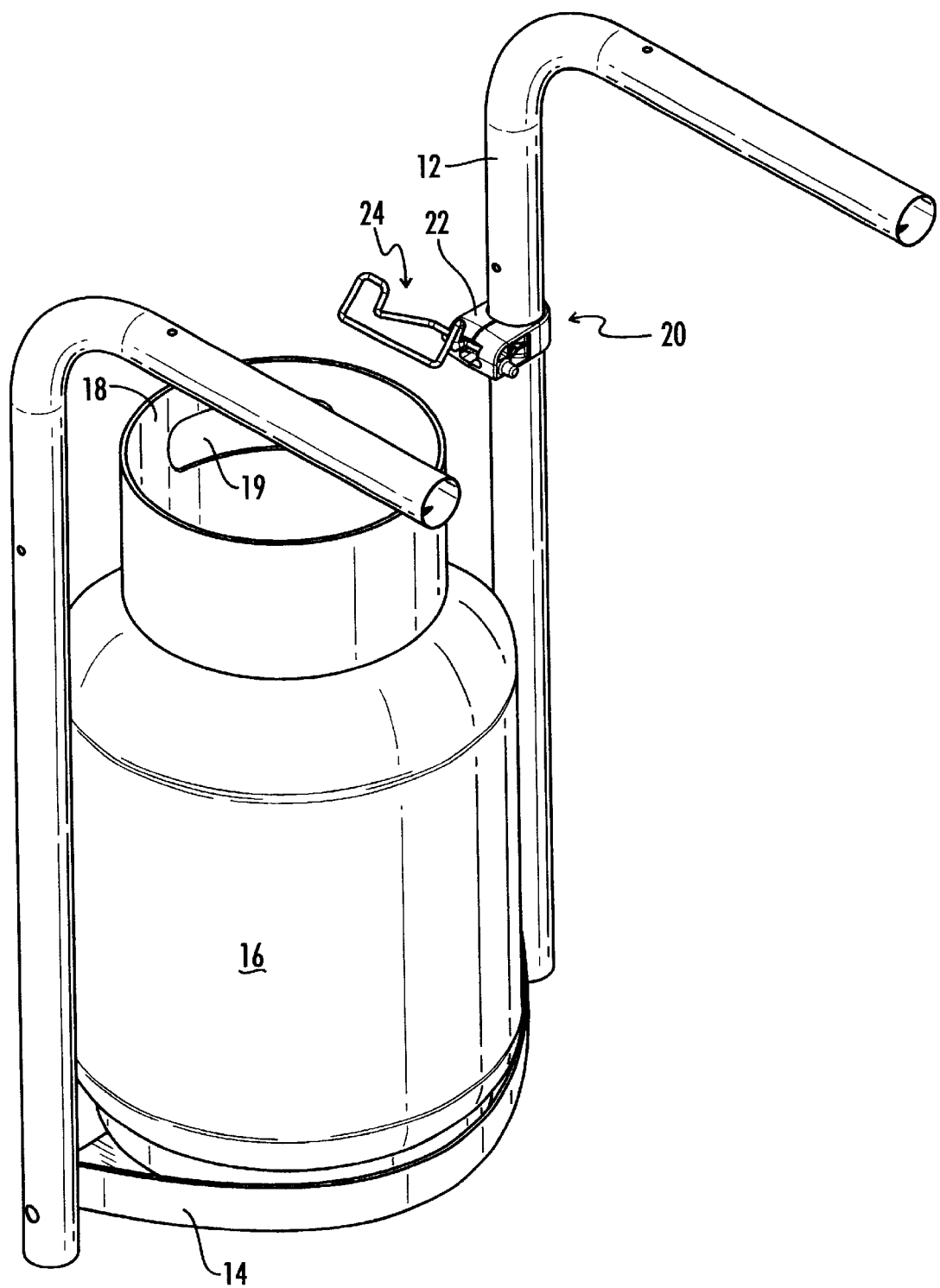
FIG. 2 is a perspective view similar to FIG. 1 with the device of the present position in the retracted position.
Figure 6:
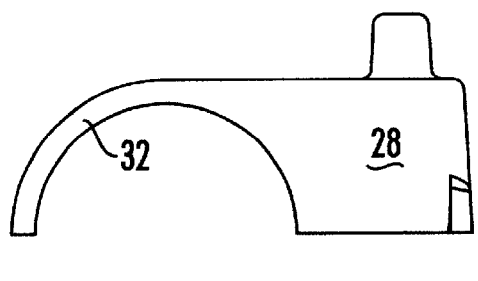
FIGS. 6, 7 and 8 are bottom, side, and front views of the bracket section shown in FIG. 5.
Figure 5:
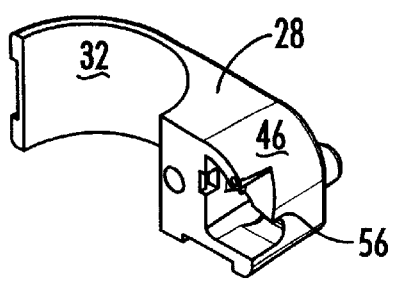
FIG. 5 is a perspective view of the right bracket section.
Figure 7:
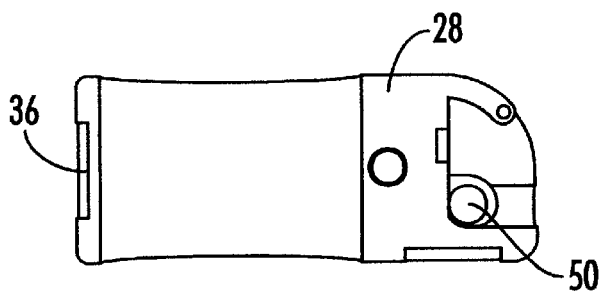
Figure 8:
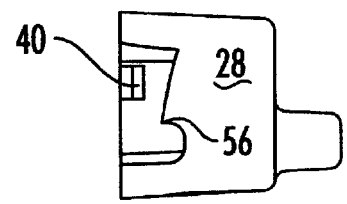
Figure 10:
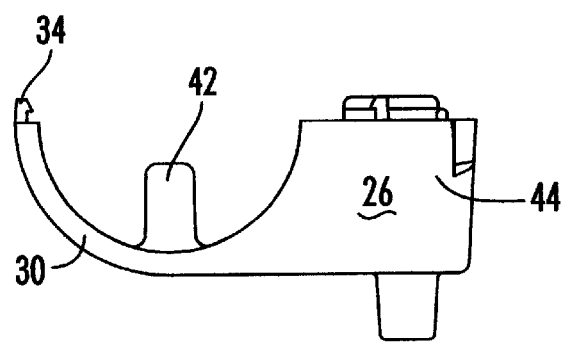
FIGS. 10, 11 and 12 are bottom, side and front views respectively of the bracket section shown in FIG. 9.
Figure 9:
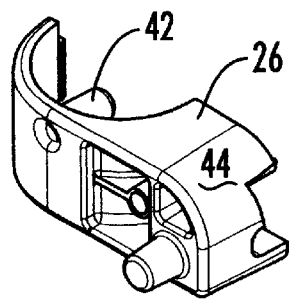
FIG. 9 is a perspective view of the left bracket section.
Figure 11:
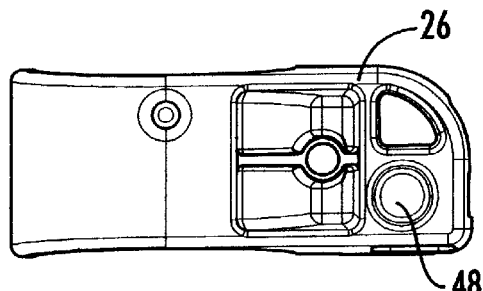
Figure 12:
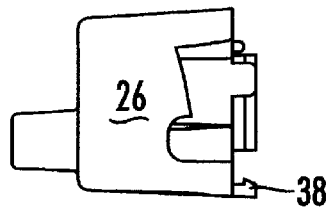
Figure 13:
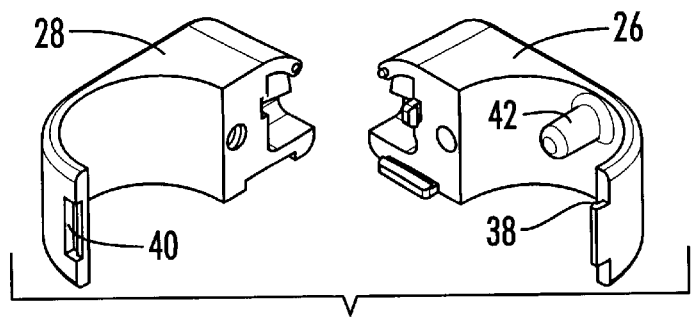
FIGS. 13, 14, 15 and 16 show various perspective views of the left and right bracket sections from different angles.
Figure 14:
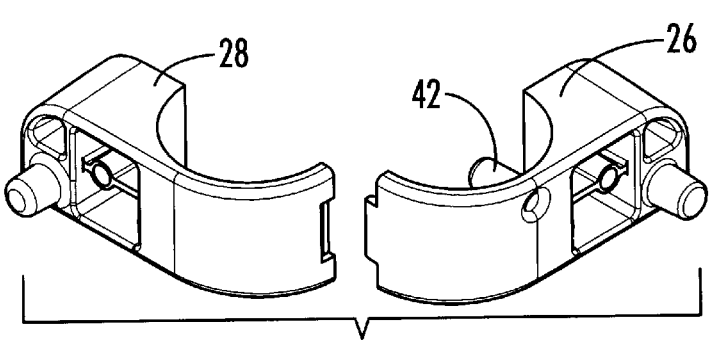
Figure 15:
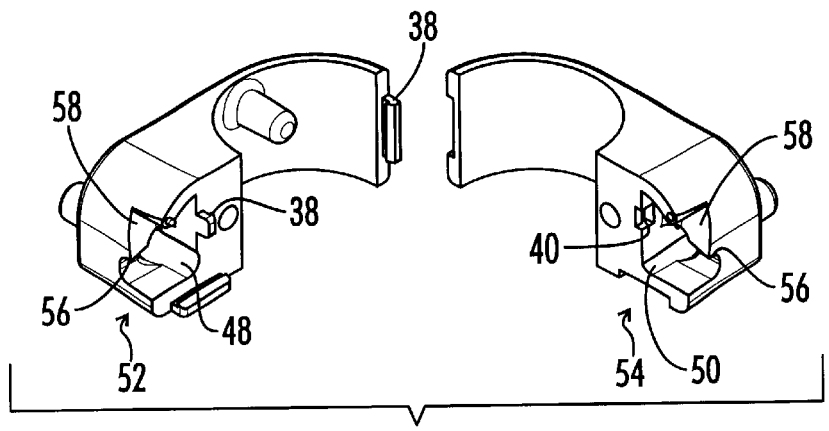
Figure 16:
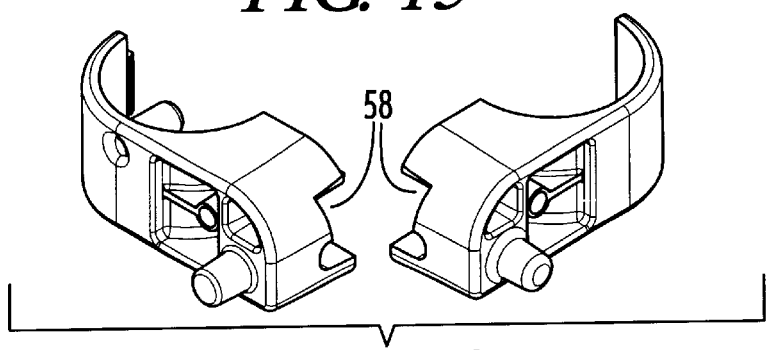
Figure 17:
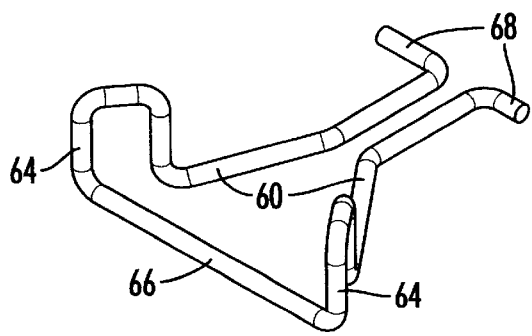
FIGS. 17, 18, 19 and 20 show perspective, top, side, and front views respectively of the tank clasp.

Referring first to FIGS. 1 and 2, there is an illustration and perspective view of the a portion of an outdoor gas grill 10 showing tubular legs 12 and base 14. Sitting on base 14 is a propane tank 16. The propane tank 16 shown is in the industry standard configuration for a typical 20-pound liquid propane tank. The tank 16 includes a standard handle ring 18 that includes an opening 19. Opening 19 serves as a gripping handle which can be used to lift the tank 16 from the grill frame 10. The tank 16 is attached to the grill frame 10 by a tank clamp 20. The tank clamp 20 has two primary parts; an attaching bracket 22 and a tank clasp 24. The attaching bracket is attached to the tubular leg 12, and the tank clasp 24 is releasably attached to the handle ring 18.

FIG. 1 shows the tank clasp 24 latched onto the handle ring 18 and FIG. 2 shows the tank clasp 24 in the retracted position where it is released from the handle ring 18.

The attaching bracket 22 is designed to fit about the tubular leg 12 and fixedly attached to the tubular leg 12.

As can be seen from FIGS. 3 and 4, the attaching bracket 22 is made in two sections, a left bracket section 26 and a right bracket section 28.

FIG. 4 shows the device of the present invention from a reverse angle from that shown in FIG. 3. From FIG. 4, one can see the hole 43 in the tubular leg 12 that is sized and shaped to receive the boss 42 projecting from the inside of the semi-circular section 30 of the left bracket section 26.

FIGS. 3 through 16 show various details of the left and right bracket sections along with the tank clasp and the relationship between the tank clasp and the bracket sections. As can be seen from FIGS. 3 and 4, the attaching bracket 22 is made up of two sections, the left bracket section 26 and the right bracket section 28. The left bracket section 26 has a left semi-circular arm 30 and the right bracket section 28 has a right semi-circular arm 32. The semi-circular arms 30 and 32 are sized and shaped to fit about the tubular leg 12 of the gas grill frame. Of course if the legs of the gas grill frame were shaped as a square or other configuration in the cross section of the leg, the semi-circular sections 30, 32 of the bracket sections 26, 28 would be shaped to mate with the shape of the leg 12. Likewise, the two semi-circular shapes do not have to be symmetrical. For example, a U bolt configuration could be employed or other configurations known to those skilled in the art for attaching a bracket about a leg of any of number of designed shapes.

To facilitate the connection of the attaching bracket 22 to the leg 20 of the gas grill frame, the left and right bracket sections have, at the end of the semi-circular arm portions, attaching devices. A male clip 34 is on the left semi-circular arm and a female clip 36 is at the tip of the right semi-circular arm. When the two bracket sections are attached about the tubular leg, the male clip 34 engages the female clip 36 to connect the ends of the semi-circular arms 30, 32.

The left and right bracket sections 26, 28 also have left and right base portions 44 and 46 respectively. The left base 44 has a male latch elements 38 and the right base 46 has a female latch element 40. When the two bracket sections are placed about the tubular leg, the male latch 38 engages the female latch 40 to connect the left base 44 to the right base 46. In this manner, the bracket sections are clamped securely about the tubular leg 12 to hold the attaching bracket in place on the tubular leg 12. A screw 41 can be threaded into and through left base 26 into a threaded hole in right base 28 to provide additional support for the connection between the left bracket section 26 and the right bracket section 28.

Of course, when the left and right bracket sections are assembled about the tubular leg 12, the boss 42 is fitted into the hole 43 in the tubular leg 12 to position the bracket both vertically on the tubular leg 12 to prevent rotation of the attaching bracket on the leg 12.

The left base 44 has a pocket 48 and the right base 46 has a pocket 50. These pockets project into the bases and are in communication with a left mouth 52 and a right mouth 54 respectively. The mouths 52, 54 formed in the left base 44 and right base 46 respectively are open to the atmosphere. The pockets receive the pivot arms 68 of the tank clasp 24 which are inserted into the pockets as the left bracket section 26 and right bracket section 28 are being assembled about the tubular leg 12. The tank clasp 24 has catch arms 62 that are attached basically perpendicularly to the pivot arms 68 and the catch arms extend out from the bracket sections through the mouths 52, 54.

Extension arms 60 are attached at one end to the catch arms 62 and have fingers 64 depending from the other end. The fingers 64 are shaped as if the fingers of a hand were cupped in order to latch over the handle ring 18 of the propane gas tank 16.

Since the pivot arms 68 extend into the pockets 48, 50, the tank clasp 10 freely rotate about the pivot arms. In order to position the tank clasp 24 to hold the propane tank 16 in position, left and right mouth portions 52, 54 each have a jaw 55 which, when the device is attached to a vertical leg, is in a substantially horizontal plane. This horizontal plane of the jaw 55 in each of the two bracket sections acts as a support for the catch arm 22 and prevents its downward rotation beyond a substantially horizontal position when the clasp is in place. This substantially horizontal pair of jaws 55 hold the tank clasp in its downward or attached position as is shown in FIG. 1.

The left and right bracket sections 26, 28 also each have a stop 56 formed in the mouths 52, 54. The stop 56 juts out from the mouth and fits over the catch arms 62 when the catch arms are in the attached position as shown in FIG. 1. Thus, the stop 56 holds the catch arm in place so that the tank clasp 24 will be fitted over the handle ring 18 of the propane tank 16 and securely hold the propane tank in place on the base 14 of the gas grill frame 10.

In order to remove the propane gas tank 16 from the grill, the tank clasp 24 must be rotated upwardly. Because of the stop 56, the tank clasp cannot rotate upwardly without further manipulation.

Figure 18:
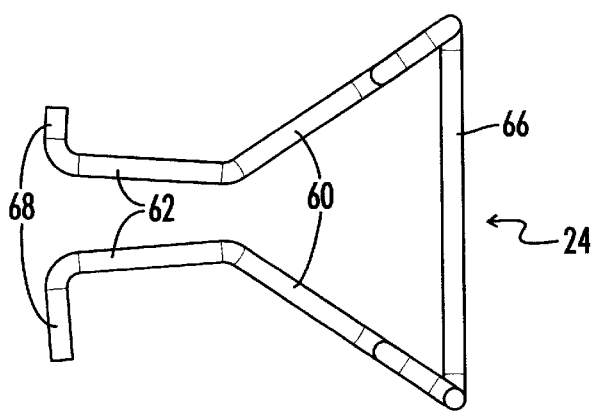
Figure 19:
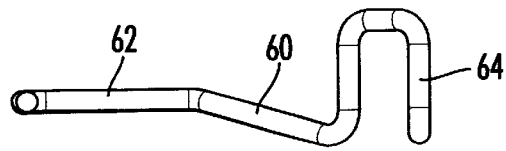
Figure 20:
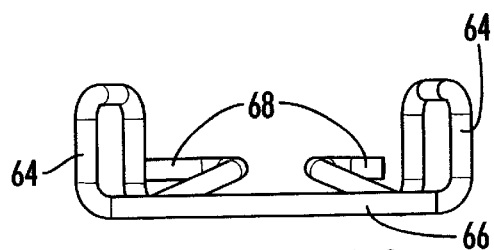

As can be seen from FIG. 18, the tank clasp is formed so that the catch arms 62 flair outwardly toward the base of the bracket sections. The length of the pivot arms 68 are such that if the two catch arms 62 are pushed inwardly toward each other, the pivot arms 68 do not release from the pockets 48 50, but the catch arms do clear the stops 56 so that the tank clasp 24 can be rotated upwardly into the released position. As the tank clasp 24 is rotated upwardly, the fingers 64 release from the handle ring 18 so that the propane tank 16 can be removed from the gas grill frame.

The left and right bracket sections 26 and 28 have release cavities 58 above the stops 56 so that the catch arm 62 can expand outwardly into the released position and hold the tank clasp in the release position until downward pressure is applied on the distal end of the clasp to cause it to rotate downwardly over the stops and back into the engaged position. The tank clasp 24 generally will have a stabilizing rod 66 extending between the opposing fingers 64 in order to provide additional stability to hold the propane tank 16 in position on the base when the tank clasp is fitted about the handle ring in the engaged position.

The preferred embodiment of the invention has been described in detail. Of course, certain parts could be reversed and the device would still operate based on the principles of the invention as claimed in the appended claims. A stop element could be formed into the tank clasp and a catch notch could be formed into the brackets to releasably hold the tank clasp in position. Other reversible parts could be designed within the concept of the disclosed invention and listing all of those variable design aspects in not necessary to understand the principles of the invention as set forth in the appended claims.

Thus, although there have been described particular embodiments of the present invention of a new and useful Tank Support System of Gas Grill, it is not intended that such references be construed as limitations upon the scope of this invention except as set forth in the following claims.

What is claimed is:

1. A device for attaching a fuel tank to a leg of a gas grill frame, the device including:

an attaching bracket for a attaching the device to the leg of the gas grill frame and a tank clasp for releasably engaging the gas tank positioned on a gas grill frame;

said attaching bracket being shaped to cooperatively engage the leg of a gas grill frame and attach to the leg of a gas grill frame;

said tank clasp moveably connected to said attaching bracket for movement between an engaging position and a releasing position for respectively engaging the gas tank positioned on the gas grill frame and for releasing the engagement of said tank clasp from the gas tank;

a stop for holding said tank clasp in said engaging position; and said device being responsive to squeezing pressure whereby said tank clasp can be positioned to clear said stop so that said tank clasp can be moved to the disengaged position.

2. The device of claim 1 wherein said attaching bracket includes two sections that are shaped to wrap about the leg of the gas grill and connect the device to the leg of the gas grill frame.

3. The device of claim 2 wherein said two sections are two separate parts that snap together to form a bracket about the leg of the gas grill frame.

4. The device of claim 3 wherein the parts snap together by the engagement a male connector element on one part with a female connector element on the other part.

5. The device of claim 2 further including at least one screw for connecting said sections.

6. The device of claim 1 further including a boss or other means on said attaching bracket for position said attaching bracket on a leg of a gas grill frame.

7. The device of claim 1 wherein said tank clasp includes fingers for grasping the fuel tank for a gas grill.

8. The device of claim 1 wherein said tank clasp includes a catch arm that is held in position by said stop when said tank clasp is in the engaging position.

9. The device of claim 8 wherein said catch arm is capable of flexing in response to pressure so that the catch arm can be move past said stop to a release position.

10. The device of claim 1 wherein said tank clasp is at least partially constructed of shaped wire.

11. A device for attaching a fuel tank to a leg of a gas grill frame the device including:

an attaching bracket for attaching the device to a leg of the leg of the gas grill frame and a tank clasp for releasably engaging the gas tank positioned on the gas grill frame;

said attaching bracket being shaped to cooperatively engage the leg of the gas grill frame and being attach to the leg of gas grill frame;

said tank clasp moveably connected to said attaching bracket for movement between an engaging position and a releasing position for respectively engaging the gas tank positioned no the gas grill frame and for releasing the engagement of said tank clasp from such the gas tank;

a stop for holding said tank clasp in said engaging position;

said device being responsive to pressure whereby said tank clasp can be positioned to clear said stop so that said tank clasp can be moved to the disengaged position; and said tank clasp including at least one pivot arm mounted in said attaching bracket with said tank clasp pivoting about said pivot arm.

12. The device of claim 11 wherein said attaching bracket has at least one pocket and said at least one pivot arm of said tank clasp fit within said pocket.

13. In combination, a gas grill frame having at least one tubular leg and a platform, a fuel tank designed to sit on said platform and having a handle ring, a tank clamp for removeably securing said fuel tank on said platform, said tank clamp including a bracket section shaped to attach to said leg and a tank clasp section for attaching to said handle ring;

said tank clasp section being connected to said attaching bracket section for movement between an attached position and a released position, and a stop for holding said tank clasp section in said attached position and said tank clasp section being flexible whereby it can be flexed so as to disengage from said stop and be moved to the released position.

14. The device of claim 13 further including a boss for locating and holding said tank clasp in a fixed relationship to said leg of said gas grill frame.

15. The device of claim 13 wherein said attaching bracket is shaped and sized to fit about the leg of the gas grill frame and mate cooperatively therewith to form a tight fit about at least a portion of the leg of the gas grill frame.

16. The device of claim 15 further including a screw to connect the two parts of said attaching bracket.

17. The device of claim 13 wherein said attaching bracket is constructed of two parts.

18. The device of claim 17 wherein said device further includes a male connector on one part and a female connector on the other so that the two parts can be snapped together to connect about the leg the of the gas grill frame.

19. The device of claim 13 wherein said tank clasp is at least partially constructed of shaped wire.

\* \* \* \* \*